United States Patent
Tanaka

Patent Number: 5,810,560
Date of Patent: Sep. 22, 1998

[54] CONTROL SYSTEM FOR NON-LINEAR CONTROL OF A SPEED SETTING AND A THROTTLE VALVE IN AN AIRCRAFT ENGINE

[75] Inventor: Shigetaka Tanaka, Susono, Japan

[73] Assignee: Toyota Jidosha Kabushiki Kaisha, Toyota, Japan

[21] Appl. No.: 656,042

[22] Filed: May 24, 1996

[30] Foreign Application Priority Data

May 30, 1995 [JP] Japan .................................. 7-131969

[51] Int. Cl.[6] ............................................ B64C 11/34
[52] U.S. Cl. ............................... 416/27; 416/30; 416/31; 416/36; 416/47
[58] Field of Search ................................ 416/25, 26, 27, 416/28, 29, 30, 31, 36, 41, 44, 47; 74/491; 244/223; 123/342, 396, 400, 403

[56] References Cited

U.S. PATENT DOCUMENTS

| | | | |
|---|---|---|---|
| 2,830,778 | 4/1958 | Greenland et al. | 244/223 |
| 3,155,165 | 11/1964 | Boyer et al. | 416/27 |
| 4,270,501 | 6/1981 | Breen et al. | 123/396 |
| 4,626,170 | 12/1986 | Dorsch . | |
| 4,693,670 | 9/1987 | Hawener et al. . | |

FOREIGN PATENT DOCUMENTS

| | | | |
|---|---|---|---|
| 0734598 | 4/1943 | Germany | 416/27 |
| 56-127336 | 9/1981 | Japan . | |
| 59-114199 | 7/1984 | Japan . | |
| 60-113800 | 6/1985 | Japan . | |
| 62-68060 | 4/1987 | Japan . | |
| 62-108548 | 7/1987 | Japan . | |
| 4-24197 | 1/1992 | Japan . | |
| 4-8697 | 1/1992 | Japan . | |

*Primary Examiner*—Christopher Verdier
*Attorney, Agent, or Firm*—Oliff & Berridge, PLC

[57] ABSTRACT

A control system for an aircraft that controls the set speed of the propeller governor and the degree of opening of the throttle valve using a single control lever. The speed setting mechanism of the propeller governor is directly connected to the power lever by a push and pull cable, and the set speed of the propeller governor changes in proportion to the stroke of the power lever. Therefore, the propeller speed changes in proportion to the stroke of the power lever. On the other hand, the throttle valve is connected to the power lever by a nonlinear cam and a push and pull cable. Therefore, the degree of opening of the throttle valve does not change in proportion to the stroke of the power lever (i.e., the change in the degree of opening of the throttle valve has a nonlinear characteristic), and the engine output power changes in the nonlinear manner with respect to the change in the propeller speed. By setting the nonlinear characteristic in the change in the engine output power with respect to the change in the propeller speed, an optimum relationship, between the engine speed and engine output power, for the aerodynamic characteristics of the aircraft can be obtained.

3 Claims, 6 Drawing Sheets

CONTROL SYSTEM FOR NON-LINEAR CONTROL OF A SPEED SETTING AND A THROTTLE VALVE IN AN AIRCRAFT ENGINE

BACKGROUND OF THE INVENTION

1. Field of the Invention

This invention relates to a control system for an aircraft engine, and more specifically, it relates to a control system, for an aircraft engine, used for driving a controllable pitch propeller.

2. Description of the Related Art

In an aircraft equipped with a controllable pitch propeller, usually the engine speed and the engine output power are separately controlled. Namely, the aircraft equipped with a controllable pitch propeller is normally provided with a propeller governor which changes the propeller pitch so that the engine speed is a predetermined set speed. Since the power consumption of the propeller changes in accordance with the propeller pitch and the propeller speed, the engine speed (i.e., the propeller speed) changes in accordance with the propeller pitch if the engine output power is kept at constant value. Further, engine output is controlled separately from the engine speed by adjusting the degree of opening of the throttle valve disposed on the intake air passage of the engine. Therefore, in the conventional control system, the pilot of the aircraft is required to adjust a governor lever for changing the set speed of the propeller governor and a throttle lever for changing the throttle valve opening simultaneously in order to obtain desired engine (propeller) speed and engine output.

However, in the above explained conventional control system, since the pilot is required to operate the governor lever and the throttle lever at the same time, complex work is required for controlling the aircraft. Further, in an aircraft engine which changes the operating air-fuel ratio of the engine to reduce the fuel consumption during cruising, the air-fuel ratio of the engine, in addition to the engine speed and engine output power, must be controlled separately. In this case, the complexity of the operation is further increased.

To solve the above-explained problems, U.S. Pat. No. 4,626,170 discloses an aggregated propulsion control system for an aircraft. In the control system of U.S. Pat. No. 4,626,170, both the set speed of the propeller governor and the degree of opening of the throttle valve is adjusted by a single control lever. In U.S. Pat. No. 4,626,170, the propeller governor and the throttle valve are connected to a single control lever (power lever) by means of a link mechanism, and the set speed of the propeller governor and the degree of opening of the throttle valve change simultaneously in accordance with the stroke of the power lever. Therefore, when the set speed of the propeller governor becomes low, the degree of opening of the throttle valve is also set at a small value, thereby a low speed and low output power operation of the engine is automatically achieved. Similarly, when the set speed of the propeller governor becomes high, since the degree of opening of the throttle valve also becomes large, a high speed and high output power operation of the engine is automatically achieved.

According to the control system in U.S. Pat. No. 4,626,170, since the engine speed and the engine output power are controlled by a single lever, the complexity of the control of the aircraft is largely reduced. However, in the control system of U.S. Pat. No. 4,626,170, though the engine speed and the engine output power are controlled by the single power lever, no consideration is taken for the characteristics of the changes in the engine speed and the engine output power. Namely, in the conventional control system, since the engine speed and the engine output power are controlled by separate levers, the pilot can select the combination of the engine speed and the engine output power freely, i.e., the pilot can set the characteristics of the engine output power with respect to the engine speed arbitrarily. However, in the control system of U.S. Pat. No. 4,626,170, since both the engine speed and the engine output power change in accordance with the stroke of the power lever, only one characteristic of the engine output power with respect to the engine speed can be selected. Therefore, the maneuverability of the aircraft is greatly affected by the setting of this characteristic. For example, if a linear characteristic in which both the engine speed and the throttle valve opening change proportionally to the stroke of the power lever is selected, the degree of opening of the throttle valve changes linearly (proportionally) with respect to the engine speed, i.e., the throttle valve opening has a linear characteristic with respect to the engine speed. This linear characteristic of the throttle valve opening, with respect to the engine speed, is not optimum in most cases.

Therefore, if the engine speed and the throttle valve opening are controlled by a single control lever, optimum characteristic of the change in the throttle valve opening with respect to the engine speed must be selected. U.S. Pat. No. 4,626,170 does not teach a means for setting the optimum characteristic of the throttle valve opening with respect to the engine speed.

SUMMARY OF THE INVENTION

In view of the problems in the related art as set forth above, the object of the present invention is to provide a control system for an aircraft engine which is capable of setting an optimum characteristic between a change in the engine output and the engine speed while controlling both the throttle valve opening and the engine speed by a single control lever.

This object is achieved by a controlling system for an aircraft engine which comprises a controllable pitch propeller connected to an aircraft engine, governor means for controlling the rotational speed of the propeller at a set speed by adjusting the pitch of the propeller, speed setting means for changing the set speed of the propeller governor, throttle means for changing the degree of opening of a throttle valve disposed on an intake air passage of the engine, control means for controlling the speed setting means and the throttle means so that the set speed and the degree of opening of the throttle valve change simultaneously in accordance with the stroke of a single control lever, and wherein the control means controls at least one of the speed setting means and the throttle means in such a manner that at least one of the set speed and the degree of opening of the throttle valve changes nonlinearly with respect to the stroke of the single control lever.

According to the present invention, the set speed of the engine and the degree of opening of the throttle valve are both controlled by a single control lever. However, at least one of the set speed and the throttle valve opening is controlled in such a manner that at least one of the set speed and the throttle valve opening changes nonlinearly with respect to the stroke of the control lever. As a result, the throttle valve changes nonlinearly with respect to the change in the engine speed. Therefore, compared to the case in which the degree of opening of the throttle valve is changed linearly with respect to the engine speed, the relationship between the change in the engine output power and the engine speed can be set to that suitable for the aerodynamic characteristics of the aircraft and the characteristics of the engine performance.

BRIEF DESCRIPTION OF THE DRAWINGS

The present invention will be better understood from the description, as set forth hereinafter, with reference to the accompanying drawings in which:

FIG. 5 through FIG. 7 show an example of the mechanism used for changing the reaction force of the power lever in accordance with the stroke thereof.

DESCRIPTION OF THE PREFERRED EMBODIMENT

Figure 1:
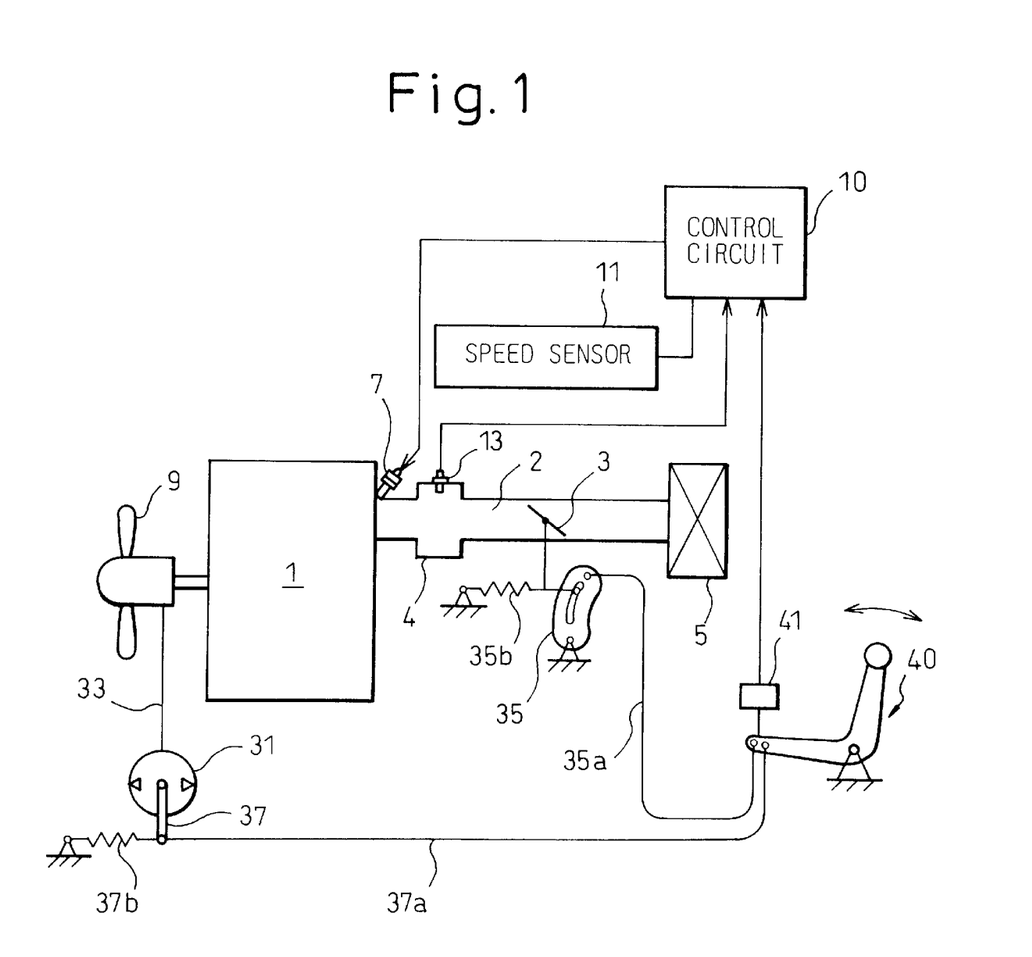
FIG. 1 is a drawing schematically illustrating an embodiment of the present invention.

FIG. 1 schematically illustrates an embodiment of the control system according to the present invention. In FIG. 1, numeral 1 designates an internal combustion engine for an aircraft. In this embodiment, the engine 1 is a multiple-cylinder type four-stroke engine. Numerals 2 and 3 designate an intake air passage of the engine 1 and a throttle valve disposed thereon, respectively. Numeral 4 designates a surge tank disposed on the intake air passage 2 downstream of the throttle valve 3, and numeral 5 is an air cleaner disposed at the end of the intake air passage 2. On the intake air passage 2, a fuel injection valve 7 is disposed at the inlet port of each cylinder of the engine 1 for injecting pressurized fuel into the inlet port of the respective cylinders (in FIG. 1, only one fuel injection valve is shown).

In FIG. 1, numeral 9 designates a controllable pitch propeller connected to an outlet shaft of the engine and numeral 31 designates a propeller governor which is connected to the engine output shaft via a driving shaft not shown in the drawing. The propeller governor 31 is a conventional centrifugal type governor which controls the rotational speed of the propeller 9 (i.e. engine speed) at a set speed by changing the pitch of the propeller 9. Namely, when the propeller speed becomes higher than the set speed, the propeller governor 31 increases the pitch of the propeller 9. When the propeller pitch is increased, the power consumption of the propeller increases, and, due to the increase in the engine load, the engine speed (propeller speed) decreases accordingly. On the contrary, when the propeller speed becomes lower than the set speed, the propeller governor 31 decreases the pitch of the propeller 9 and, thereby, the power consumption of the propeller decreases and the engine speed increases. Thus, the engine speed (propeller speed) is controlled to the speed set by the propeller governor 31. The propeller governor 31 and a variable pitch mechanism of the propeller 9 are connected each other by a control oil pipe 33.

Numeral 10 in FIG. 1 is a control circuit for performing various types of control of the engine 1. The control circuit 10 is consist of, for example, a known type microcomputer which comprises a RAM (random access memory), a ROM (read-only memory) and a CPU (central processing unit), all connected each other by a bi-directional bus. The control circuit 10 performs basic control of the engine 1, such as fuel injection control and ignition timing control. In order to perform the engine control, various signals are fed to the control circuit 10. For example, an engine speed signal which represents the rotational speed N of the engine is fed from a speed sensor 11 disposed at the crankshaft (not shown in the drawing) and, an inlet air pressure signal which represents the absolute pressure in the surge tank 4 is fed from a pressure sensor 13 disposed at the surge tank 4. Further, as explained later, a position signal which represents the position of a power lever 40 is fed from a position sensor 41 to the control circuit 10. The control circuit 10 is connected to the fuel injection valves 7 of the respective cylinders via a drive circuit (not shown in the drawing) to control the amount of fuel injected from the respective fuel injection valves 7.

In this embodiment, a power lever 40 is provided for adjusting both the set speed of the propeller governor 31 and the degree of opening of the throttle valve 3 simultaneously. As shown in FIG. 1, one end of the power lever is connected to a speed setting mechanism 37 of the propeller governor 31 and a throttle opening setting cam 35 via push and pull cables 37a and 35a, respectively. In this embodiment, when the power lever 40 is operated, the speed setting mechanism 37 and the throttle opening cam 35 are driven by the push and pull cable 37a and 35a by an amount proportional to the stroke of the power lever 40.

Shown, by 37b and 35b in FIG. 1, are bias springs for the speed setting mechanism 37 and the throttle opening setting cam 35, respectively. The bias spring 37b urges the speed setting mechanism to the direction in which the setting speed of the propeller governor 31 is increased, and the bias spring 35b urges the throttle opening setting cam 35 to the direction in which the degree of opening of the throttle valve 3 is increased. Therefore, if one of the cables 37a and 35b breaks, the set speed of the propeller governor 31, or the degree of opening of the throttle valve 3 is automatically set at the maximum value. Since the propeller speed or the engine output is fixed at the maximum value when one of the cables 37a or 35b breaks, the thrust force of the propeller can be easily controlled using the remaining push and pull cable even if one of the cables breaks.

In this embodiment, the set speed of the propeller governor changes in proportion to the displacement of the speed set mechanism 37. Therefore, the set speed of the propeller governor 31 changes linearly with respect to the stroke of the power lever 40. On the other hand, the throttle opening setting cam 35 in this embodiment is formed as a nonlinear cam, and the degree of opening of the throttle valve 3 does not change in proportion to the displacement of the cam 35. Namely, the degree of opening of the throttle valve changes nonlinearly with respect to the stroke of the power lever 40.

Figure 2:
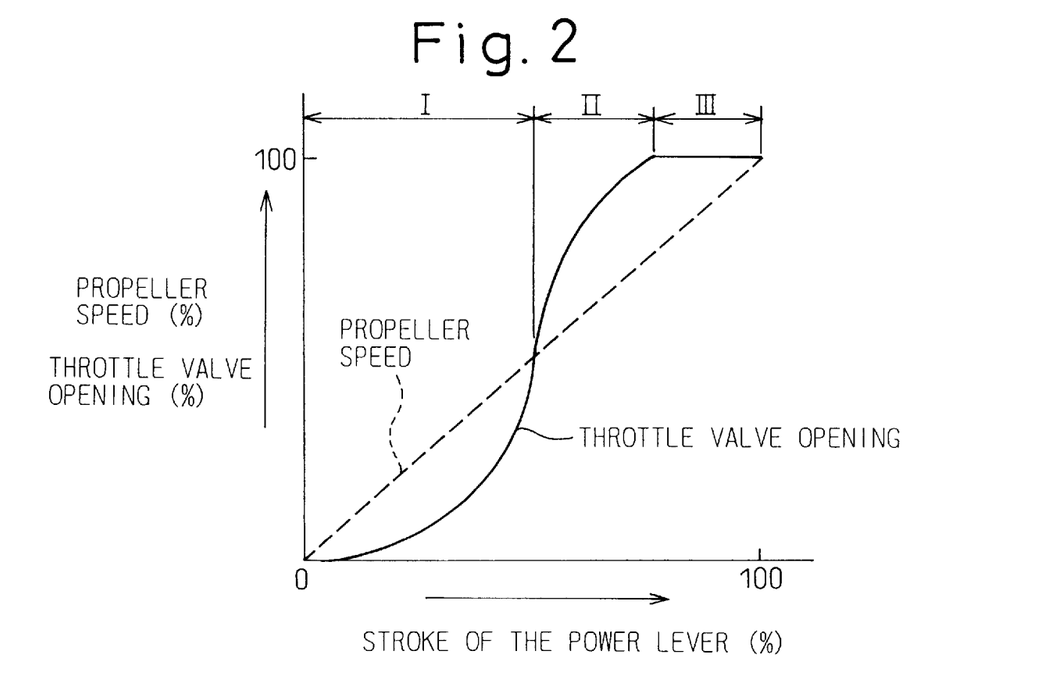
FIG. 2 is a graph showing an example of the characteristic of a change in the degree of opening of the throttle valve and the propeller speed with respect to the stroke of the power lever.

FIG. 2 shows the characteristic of the change in the set speed of the propeller governor 31 and the degree of opening of the throttle valve 3 with respect to the stroke of the power lever 40. In FIG. 2, the vertical axis represents the degree of opening of the throttle valve and the set speed of the propeller governor. The horizontal axis represents the stroke of the power lever 40. The set speed of the propeller governor, the degree of opening of the throttle valve and the stroke of the power lever are indicated by percentages of the full speed, the full throttle opening and the full stroke of the power lever, respectively. In FIG. 2, the broken line represents the change in the set speed of the propeller governor and the solid line represents the change in the degree of opening of the throttle valve. As shown in FIG. 2, both the set speed and the degree of opening of the throttle valve become 0 when the stroke of the power lever is 0, and become 100% when the stroke of the power lever is 100%. However, though the set speed of the propeller governor (the broken line) changes linearly (proportionally) to the stroke of the power lever 40, the degree of opening of the throttle valve (the solid line) shows a nonlinear change with respect to the stroke of the power lever. For example, the degree of opening of throttle valve in this embodiment becomes smaller compared to the case in which the degree of opening of the throttle valve changes linearly to the stroke of the power lever when the set speed of the propeller governor is relatively low (in the region shown by I in FIG. 2). Contrary to this, when the set speed of the propeller governor is relatively high (in the region shown by II in FIG. 2), the degree of opening of the throttle valve in this embodiment becomes larger compared to the case in which the degree of opening of the throttle valve changes linearly to the stroke of the power lever. Further, when the set speed of the propeller governor further increases, the degree of opening of the throttle valve reaches 100% (the full throttle condition) before the set speed reaches 100% (the maximum speed), and is held at the full throttle condition (in the region shown by III in FIG. 2).

Figure 3:
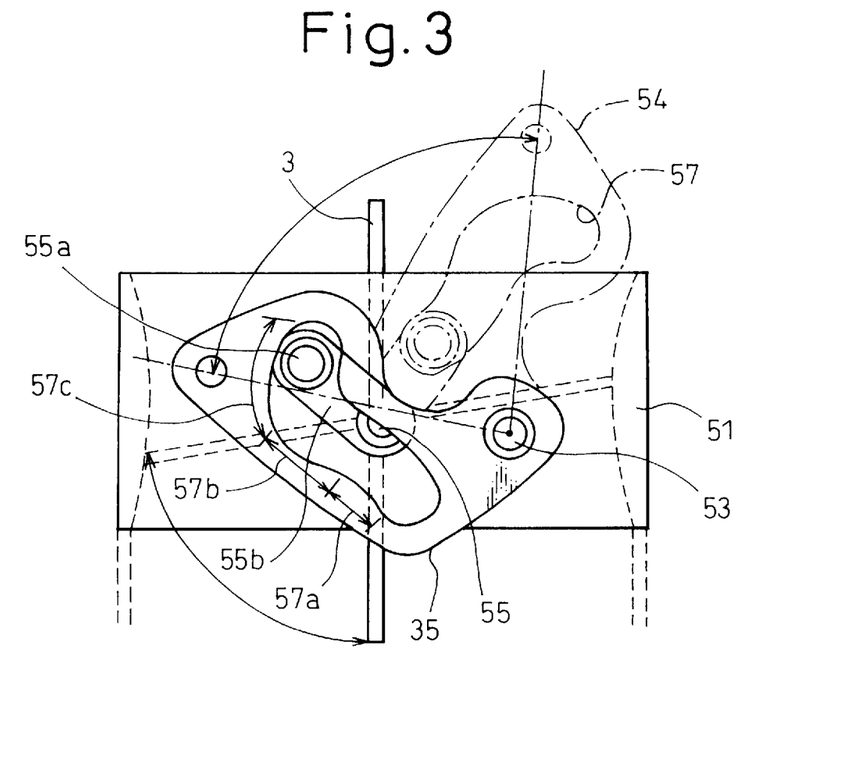
FIG. 3 shows the configuration of the nonlinear cam used for setting the nonlinear characteristic of the degree of opening of the throttle valve.

FIG. 3 shows the construction of the throttle opening setting cam 35 required for obtaining the nonlinear characteristic of the degree of opening of the throttle valve as shown in FIG. 2. The cam 35 is attached, at one end thereof, to a throttle body 51 disposed on the intake air passage 2 by a pivot pin 53. The push and pull cable 35a is connected to the cam 35 at the end 54 opposite to the pin 53. The throttle valve 3 is fixed to the drive shaft 55 which penetrates the throttle body 51 and rotates together with the drive shaft 55. An arm 55b which is provided with a pin 55a at one end thereof is fixed to the end of the shaft 55, and the pin 55a engages a cam groove 57 formed on the cam 35.

When the power lever 40 is operated by the pilot of the aircraft, the cam 35 is driven by the cable 35a and rotates around the pin 53. When the cam 35 rotates, the pin 55a moves along the cam groove 57 to thereby rotate the throttle valve 3 via the arm 55b and the shaft 55. The solid line in FIG. 3 shows the position of the cam 35 in which the throttle valve 3 is fully opened, and the broken line shows the position of the cam 35 at which the throttle valve 3 is fully closed. Namely, when the stroke of the power lever 40 is 0, the cam 35 takes the position as shown by the broken line, and the pin 55a engages the section 57a of the cam groove 57. When the stroke of the power lever 40 increases from this condition, the pin 55a moves along the section 57a of the groove 57. The profile of the cam section 57a is determined in such a manner that the rate of the change in the rotation angle of the arm 55b with respect to the rotation of the cam 35 is small at the beginning of the cam section 57a, and increases as the rotation angle of the cam 35 increases. Therefore, during the period in which the pin 55a engages the cam section 57a, the degree of opening of the throttle valve changes in accordance with the stroke of the power lever 40 as shown in FIG. 2, region I. When the stroke of the power lever 40 increases, the rotation angle of the cam 35 increases and the pin 55a engages with the section 57b of the cam groove 57. The profile of the cam section 57b is formed in such a manner that the rate of the change in the rotation angle of the arm 55b with respect to the rotation of the cam 35 is large at the beginning of the cam section 57b, and decreases as the rotation angle of the cam 35 increases, and the degree of opening of the throttle valve reaches 100% at the end of the cam section 57b. Therefore, during the period in which the pin 55a engages the cam section 57b, the degree of opening of the throttle valve changes as shown in FIG. 2, region II. When the stroke of the power lever 40 further increases, the pin 55a engages with the cam section 57c which follows the cam section 57b. The profile of the cam section 57c is formed so that the throttle valve 3 is held at the fully opened position regardless of the rotation angle of the cam 35. Therefore, the throttle valve 3 is held at its fully opened position regardless of the stroke of the power lever 40.

By setting the characteristic of the change in the degree of opening of the throttle valve as shown in FIG. 2, the amount of the change in the degree of opening of the throttle valve with respect to the stroke of the power lever 40 becomes smaller compared to the case in which the degree of opening of the throttle valve is changed linearly with respect to the stroke of the power lever 40 when the propeller speed is relatively low (the region I in FIG. 2). Therefore, a fine control of the engine output power can be achieved in the low propeller speed region and, thereby, the maneuverability of the aircraft in the low propeller speed region is improved in this embodiment. Further, the engine output power in the low propeller speed region becomes smaller compared to the case in which the degree of opening of the throttle valve changes in proportion to the stroke of the power lever and, as a result, the propeller pitch is set at a smaller compared to the case in which the degree of opening of the throttle valve changes in proportion to the stroke of the power lever. Therefore, according to the present embodiment, the thrust force generated by the propeller becomes smaller in the low propeller speed region compared to the case in which the degree of opening of the throttle valve changes in proportion to the stroke of the power lever, and, since a large reduction in the propeller thrust is obtained in the low propeller speed region, the operation for decelerating the aircraft becomes easier.

Contrary to the above, in the high propeller speed region (region II in FIG. 2), the degree of opening of the throttle valve becomes larger compared to the case in which the degree of opening of the throttle valve changes in proportion to the stroke of the power lever. Therefore, the propeller pitch is set at a larger value compared to the case in which the degree of opening of the throttle valve changes in proportion to the stroke of the power lever, and, thereby, a large propeller thrust is obtained in the high propeller speed region. This facilitates the operation of the aircraft in the conditions which requires large thrust such as during take-off or landing. Further, according to the present embodiment, the degree of opening of the throttle valve is set at a larger value in the high propeller speed region and the fuel consumption of the engine is reduced in the high propeller speed region due to the decrease in the pressure loss through the throttle valve.

Figure 4:
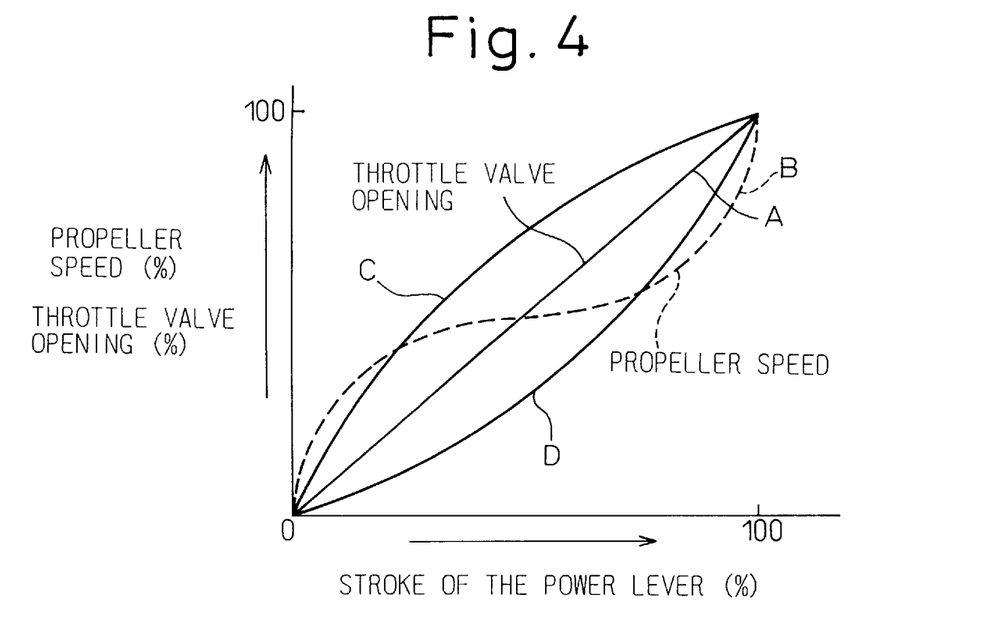
FIG. 4 is a graph showing another example of the characteristic of the change in the degree of opening of the throttle valve and the propeller speed with respect to the stroke of the power lever.

In the above embodiment, the set speed of the propeller governor has a linear characteristic and the degree of opening of the throttle valve opening has a nonlinear characteristic. However, a similar effect can be obtained by setting the set speed with a nonlinear characteristic and setting the degree of opening of the throttle valve opening with a linear characteristic as shown by the curves A and B, respectively, in FIG. 4. In this case, the profile of the cam groove 57 of the cam 35 is formed in such a manner that the degree of opening of throttle valve becomes proportional to the rotation angle of the cam 35, and a nonlinear cam similar to the cam 35 in FIG. 3 is provided on the speed setting mechanism 37 of the propeller governor 31. Further, nonlinear characteristics may be given to both the set speed and the degree of opening of the throttle valve opening by providing nonlinear cams, similar to the cam 35 in FIG. 3, to both of the speed setting mechanism 37 and the throttle valve 3.

The characteristics of the set speed of the propeller governor and the degree of opening of the throttle valve opening must be determined in accordance with aerodynamic characteristics of the aircraft body and, in some cases the characteristic of the set speed of the propeller governor and the degree of opening of the throttle valve different from those in FIG. 2 are required. Since the nonlinear cam is used as the throttle opening setting cam 35, a desired characteristic of the degree of opening of the throttle valve is easily obtained by changing the profile of the cam groove 57 in this embodiment. For example, the characteristics as shown by the curves C or D in FIG. 4 can be easily obtained in accordance with the aerodynamic characteristics of the aircraft body. Further, if the nonlinear cam is provided on the speed setting mechanism 37, the characteristic of the set speed of the propeller governor can be changed arbitrarily.

Though the above embodiment uses a nonlinear cam to obtain the nonlinear characteristic, the nonlinear characteristic can be obtained by other methods. For example, a link mechanism instead of the nonlinear cam may be used for obtaining the nonlinear characteristic. Further, the nonlinear characteristic may be achieved by driving either of the speed setting mechanism 37 or the throttle valve 3 using an independent actuator (such as a stepper motor or a hydraulic actuator). In this case, the actuator is controlled by the control circuit 10 in such a manner that a nonlinear characteristic of the set speed or the degree of opening of the throttle valve opening is obtained.

Next, the construction of the power lever 40 is explained. The power lever 40 in this embodiment is provided with a mechanism for changing the reaction force for the operation of the power lever in accordance with the position of the power lever. Namely, the reaction force of the power lever in this embodiment is kept relatively small until the stroke of the power lever increases to a certain value (for example, about 75% of full stroke), and becomes larger when the stroke of the power lever exceeds that value.

The stroke of the power lever at which the reaction force is changed (increased) corresponds to the stroke at which the operating air-fuel ratio of the engine is switched from a lean air-fuel ratio to a rich air-fuel ratio.

The operating air-fuel ratio of the engine 1 is controlled by the control circuit 10. The control circuit 10 operates the engine at a rich air-fuel ratio compared to the stoichiometric air-fuel ratio (for example, at the air-fuel ratio of about 12.0) when the engine output power is low (for example, less than 30% of the maximum output power of the engine 1), and when the engine output power is in the cruising range (for example, about 30 to 75% of the maximum output power), the control circuit 10 operates the engine at a lean air-fuel ratio compared to the stoichiometric air-fuel ratio (at the air-fuel ratio of about 18.0). When the engine output power further increases, the control circuit 10 operates the engine again at the rich air-fuel ratio compared to the stoichiometric air-fuel ratio.

In order to reduce the fuel consumption of the engine, it is preferable to operate the engine at a lean air-fuel ratio. However, if the engine is operated at a lean air-fuel ratio when the engine output power is low, the engine operation may become unstable. Further, if the engine is operated at a lean air-fuel ratio when a high engine output power is required, problems such as low engine output power, or the damage to the elements in the engine exhaust system, due to an increase in the exhaust gas temperature, may occur. Therefore, in this embodiment, the engine 1 is operated at a rich air-fuel ratio to achieve a stable engine operation when the engine output power is low. In the engine middle output power range (the cruising range) at which the engine is most frequently operated, the engine is operated at a lean air-fuel ratio to reduce the fuel consumption of the engine. Further, in the engine high output power range, the engine is operated at a rich air-fuel ratio to increase the engine output power and to reduce the exhaust gas temperature.

When the engine power increases from low output power range (for example, less than 30% of the maximum power) to the cruising range, the control circuit 10 gradually changes the operating air-fuel ratio of the engine from the lean air-fuel ratio to the rich air-fuel ratio to avoid a sudden decrease in the engine output power. However, when the engine output power increases from the cruising range to the high output power range (more than 75% of the maximum power), the control circuit 10 switches the operating air-fuel ratio from the lean air-fuel ratio to the rich air-fuel ratio rapidly to prevent the damage of the elements in the exhaust gas system. Therefore, when the engine output power increases from the cruising range to the high output power range, the engine output power suddenly increases due to the change in the operating air-fuel ratio. If the sudden increase in the engine output power occurs when the pilot of the aircraft does not expect it, the operation of the aircraft may be disturbed by a sudden ascent of the aircraft caused by the sudden increase in the engine output power. Further, even if the operation of the aircraft is not disturbed by the sudden increase in the engine power, the cruising distance of the aircraft may decrease due to an increase in the fuel consumption if the engine is operated frequently at the rich air-fuel ratio. In the conventional control system, an alarm is provided at the cockpit in order to inform the pilot that the engine operating air-fuel ratio is switched from the lean air-fuel ratio to the rich air-fuel ratio. Therefore, the pilot must watch the alarm when the engine is operated at near the border between the cruising range and the high output power range.

In this embodiment, to eliminate the necessity for watching the alarm, the switching of the air-fuel ratio is notified to the pilot by a change in the reaction force of the power lever. Since the position of the power lever 40 exactly corresponds to the engine output power (i.e., the degree of opening of the throttle valve), the operating air-fuel ratio is switched in accordance with the position (stroke) of the power lever 40 in this embodiment.

In this embodiment, the control circuit 10 calculates the fuel injection amount TAU of the fuel injection valve 7 based on the following formula.

$$TAU = TAUP \times \alpha \times K$$

TAUP in the above formula is a base fuel injection amount which is the amount of the fuel required to maintain the air-fuel ratio of the air-fuel mixture fed to the engine at a stoichiometric air-fuel ratio, and $\alpha$ is a constant determined by the operating conditions of the engine. K is a correction factor for switching the air-fuel ratio of the engine. TAUP is given as a function of the inlet air pressure PM and the engine speed N in advance, and the control circuit 30 calculates TAUP at regular intervals based on the inlet air pressure PM detected by the sensor 13 and the engine speed N detected by the speed sensor 11. The correction factor K is determined in accordance with the position of the power lever 40 detected by the position sensor 41. Namely, the correction factor K is set at a value larger than 1.0 when the power lever 41 is positioned in the low output power range. Therefore, the value of TAU in the above formula becomes larger than TAUP (base fuel injection amount) and a rich air-fuel ratio operation of the engine is performed. When the position of the power lever 40 is in the cruising range, the correction factor K is set at a value smaller than 1.0, and the TAU in the above formula becomes smaller than TAUP and the engine 1 is operated at a lean air-fuel ratio. Further, when the stroke of the power lever 40 increases to the high output power range, the correction factor K is again set at a value larger than 1.0, and the engine is operated at a rich air-fuel ratio. Thus, the engine 1 is operated at an air-fuel ratio determined in accordance with the engine output power.

Next, the mechanism for changing the reaction force of the power lever 40 is explained with reference to FIGS. 5 through 7.

Figure 5:
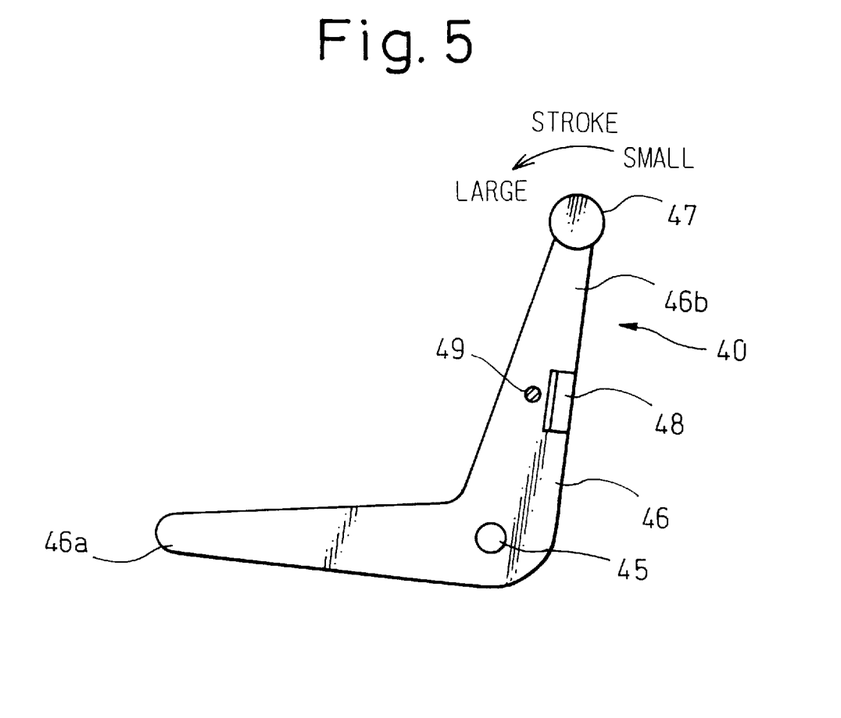
Figure 6:
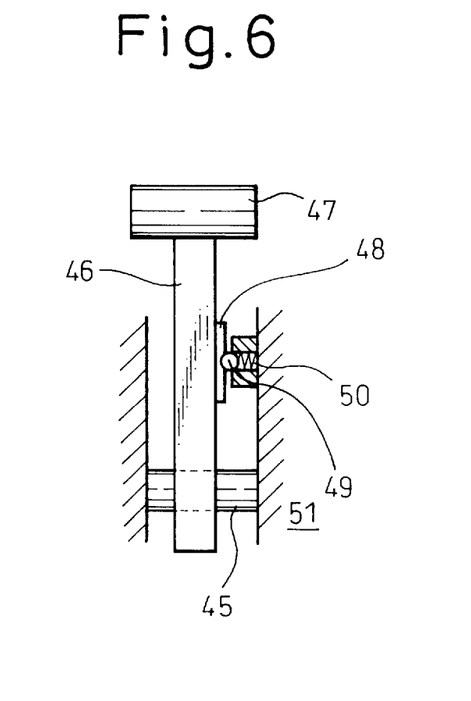
FIG. 6 is a partial sectional view of the mechanism.

FIG. 5 and FIG. 6 show the side view and the front view, respectively, of the power lever 40. The power lever 40 comprises a lever member 46 pivotably attached to a shaft 45 and a handle 47 disposed at one end 46b of the lever member 46. At the other end 46a of the lever member 46, the push and pull cables 35a and 37a are connected. On one side of the lever member 46, a shim 48 for adjusting the reaction force is attached at the portion between the handle 47 and the shaft 45. Between the side of the lever member 46 and the bracket 51 of the power lever 40, a ball 49 and a spring 50 which urges the ball 49 against the side of the lever member 46 are disposed. When the power lever 40 is operated by the pilot, the ball 49 pressed against the side of the member 46 generates the reaction force against the movement of the lever 40. The shim 48 is disposed at the portion of the lever member 46 which corresponds to the position of the power lever 40 in the high output power range. Therefore, when the power lever 40 is in the position corresponding to the high output power range, the spring 50 is further compressed by the amount corresponding to the thickness of the shim 48. Therefore, the reaction force generated by the ball 49 is increased when the power lever 40 is in the position corresponding to the high output power range.

Figure 7:
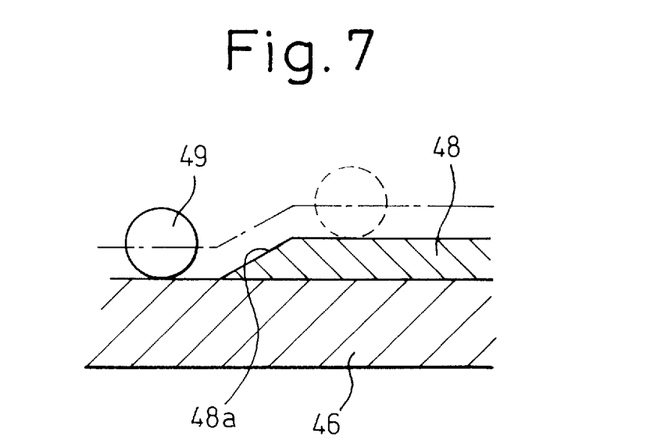
FIG. 7 is a sectional view of the mechanism.
Figure 8:
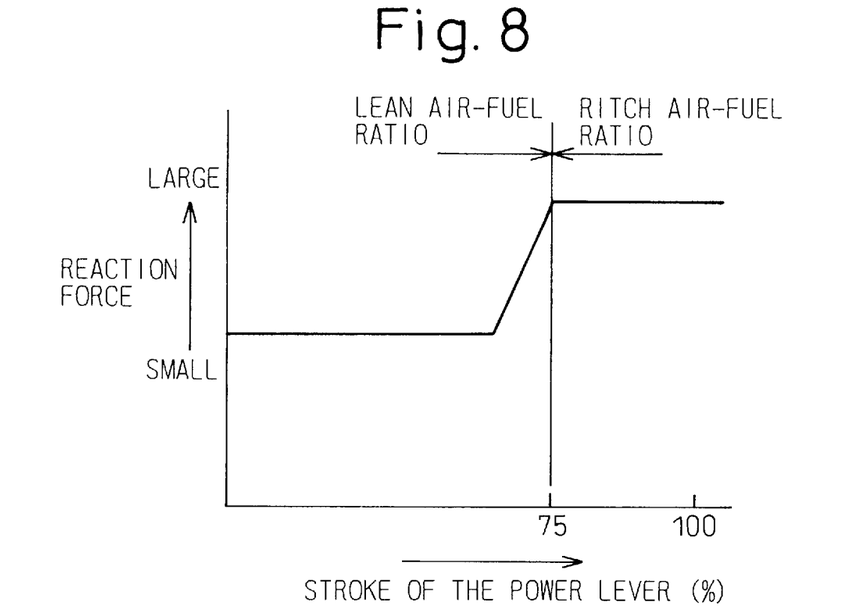
FIG. 8 is a diagram showing the change in the reaction force of the power lever generated by the mechanism in FIG. 5 through FIG. 7.

FIG. 7 shows an enlarged cross section of the shim 48 disposed on the side of the lever member 46. As shown in FIG. 7, a tapered portion 48a is formed at the end of the shim 48 to gradually increase the reaction force of the power lever 40. In this embodiment, the tapered portion 48a is located at the portion of the member 46 which corresponds to the end of the cruising range. Therefore, when the engine output power is increased from the cruising range to the high output power range, the reaction force is gradually increased before the operating air-fuel ratio is switched to the rich air-fuel ratio, to give a warning to the pilot of the aircraft. FIG. 8 shows the change in the reaction force according to the stroke of the power lever 40. As shown in FIG. 8, since the reaction force increases before the operating air-fuel ratio of the engine is switched from the lean air-fuel ratio to the rich air-fuel ratio, the pilot is not required to watch the alarm when operating the power lever 40 near the border between the cruising range and the high output power range.

Figure 9:
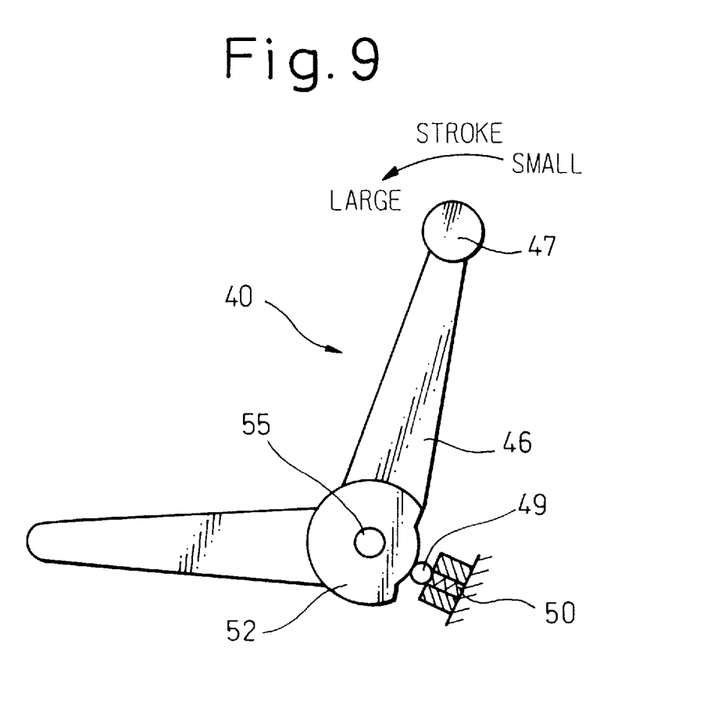
FIG. 9 shows a partial sectional view of another example of the mechanism used for changing the reaction force of the power lever in accordance with the stroke thereof.

Though the shim 48 and the ball 49 are used for changing the reaction force of the power lever 40 in the above embodiment, other mechanisms may be used for changing the reaction force of the power lever 40. For example, FIG. 9 shows a mechanism which uses a cam and a ball to change the reaction force of the power lever 40. In FIG. 9, a cam 52 is fixed on the lever member 46 around the pivot shaft 55, and the ball 49 is pressed against the face of the cam 52 by the spring 50. The profile of the cam 52 is formed in such a manner that the section of the profile of the cam 52 corresponding to the high output power range has a higher lift than any other portion of the profile of the cam 52 to, thereby, increase the reaction force generated by the ball 49 and the spring 50.

Figure 10:
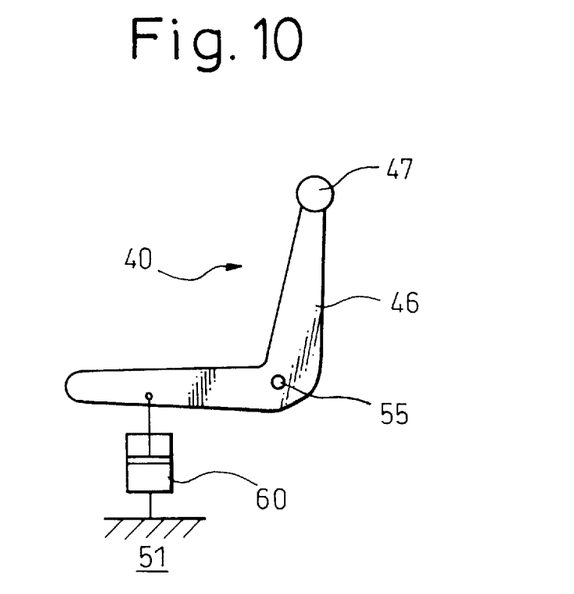
FIG. 10 shows another example of the mechanism used for changing the reaction force of the power lever in accordance with the stroke thereof.

Further, the reaction force of the power lever 40 may be changed by a mechanisms which does not use a ball 49 and a spring 50. FIG. 10 shows a mechanism which uses a variable damper 60 for changing the reaction force. FIG. 10 shows the case in which the variable damper 60 is attached to the power lever 40. However, the variable damper may be attached to the throttle opening setting cam 35 (or, speed setting mechanism 37 of the propeller governor 31, or both the cam 35 and the speed setting mechanism 37).

Figure 11:
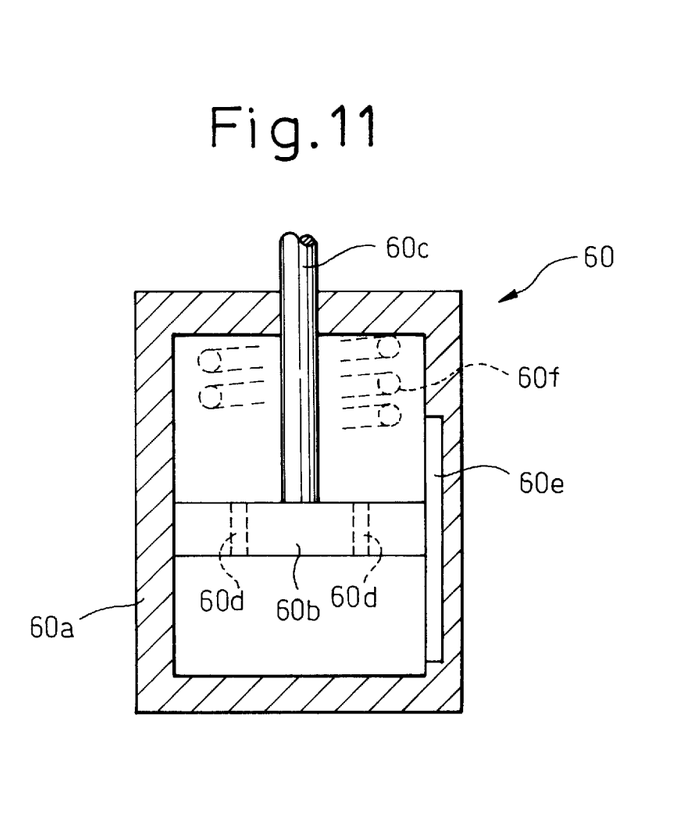
FIG. 11 shows a partial sectional view of an example of the variable damper used in the mechanism in FIG. 10.

FIG. 11 shows an example of the construction of the variable damper 60. The variable damper 60 in this embodiment has a construction similar to the conventional hydraulic damper and consists of a cylinder 60a, a piston 60b sliding inside the cylinder 60a and the rod 60c connected to the piston 60b. In the embodiment in FIG. 10, the rod 60c is connected to the lever member 46 of the power lever 40, and the cylinder 60a is fixed to the bracket 51. Piston 60b is provided with oil passages 60d as shown in FIG. 11. When the power lever is operated, the piston is moved by the power lever 40, and the hydraulic oil filled in the cylinder 60a flows from one side of the piston to the other side through the oil passages 60d. The reaction force is generated by the friction of the oil flowing through the oil passages 60d. The variable damper 60 in FIG. 11 has an oil groove 60e on the inner surface of the cylinder 60a. The oil groove 60e has a predetermined length in the axial direction of the cylinder 60a and acts as an additional oil passage for changing the reaction force. When the piston 60b slides on the inner surface of the cylinder 60a at the portion where the oil groove 60e is disposed, since the hydraulic fluid flows through the oil groove 60e in addition to the oil passages 60d in the piston 60b, the reaction force becomes small. In this embodiment, the oil groove 60e is disposed on the portion of the inner surface of the cylinder 60a which covers the range of the positions of the piston (i.e., the positions of the power lever 40) corresponding to the cruising range of the engine output power. The inner surface which corresponds to the position of the piston when the power lever 40 is in the position within the high output power range is not provided with the oil groove. Therefore, when the power lever 40 is in the position corresponding to the high output power range, the reaction force of the power lever 40 becomes large. If the depth of the oil groove 60e is decreased gradually at the end of the cruising range, the reaction force gradually increases as shown in FIG. 8. Further, if a spring 60f which engages the piston 60b when the piston 60b is positioned in the high output power range, the reaction force in the high output power range may be further increased.

I claim:

1. A control system for an aircraft engine comprising:

a controllable pitch propeller connected to the aircraft engine;

governor means for controlling a rotational speed of the propeller to a set speed by adjusting the pitch of the propeller;

speed setting means for changing said set speed of the propeller governor;

throttle means for changing a degree of opening of a throttle valve disposed on an intake air passage of the engine;

control means for controlling said speed setting means and said throttle means, said control means including a single control lever, said control means controlling said speed setting means and said throttle means so that said set speed and the degree of opening of the throttle valve change simultaneously in accordance with a stroke of the single control lever; and wherein said control means controls at least one of said speed setting means and said throttle means in such a manner that the set speed and the degree of opening of the throttle valve change nonlinearly with respect to each other; and wherein said control means controls said throttle means in such a manner that the rate of change of the degree of opening of the throttle valve is smaller compared to the rate of change of said speed setting means when the propeller speed is within a predetermined low speed range, and is larger compared to the rate of change of said speed setting means when the propeller speed is within a predetermined high speed range.

2. A control system for an aircraft engine comprising:

a controllable pitch propeller connected to the aircraft engine;

governor means for controlling a rotational speed of the propeller to a set speed by adjusting the pitch of the propeller;

speed setting means for changing said set speed of the propeller governor;

throttle means for changing a degree of opening of a throttle valve disposed on an intake air passage of the engine;

control means for controlling said speed setting means and said throttle means, said control means including a single control lever, said control means controlling said speed setting means and said throttle means so that said set speed and the degree of opening of the throttle valve change simultaneously in accordance with a stroke of the single control lever; and wherein said control means controls at least one of said speed setting means and said throttle means in such a manner that the set speed and the degree of opening of the throttle valve change nonlinearly with respect to each other; and wherein said control means controls said speed setting means in such a manner that the rate of change of the set speed of the governor means is larger compared to the rate of change of the degree of opening of the throttle valve when the engine output power is within a predetermined low output power range and is smaller compared to the rate of change of the degree of opening of the throttle valve when the engine output power is within a predetermined high output power range.

3. A control system for an aircraft engine comprising:

a controllable pitch propeller connected to the aircraft engine;

governor means for controlling a rotational speed of the propeller to a set speed be adjusting the pitch of the propeller;

speed setting means for changing said set speed of the propeller governor;

throttle means for changing a degree of opening of a throttle valve disposed on an intake air passage of the engine;

control means for controlling said speed setting means and said throttle means, said control means including a single control levers, said control means controlling said speed setting means and said throttle means so that said set speed and the degree of opening of the throttle valve change simultaneously in accordance with a stroke of the single control lever; and wherein said control means controls at least one of said speed setting means and said throttle means in such a manner that the set speed and the degree of opening of the throttle valve change nonlinearly with respect to each other; and said control system further comprising an air-fuel ratio switching means for switching an operating air-fuel ratio of the engine from a lean air-fuel ratio to a rich air-fuel ratio when the engine output power becomes larger than a predetermined value, and warning means for increasing a reaction force for operating said single control lever when the air-fuel ratio switching means switches the operating air-fuel ratio of the engine from said lean air-fuel ratio to said rich air-fuel ratio.

* * * * *